April 10, 1956  G. L. OSWALT  2,741,371
PALLET LIFTER
Filed June 24, 1952  2 Sheets-Sheet 2
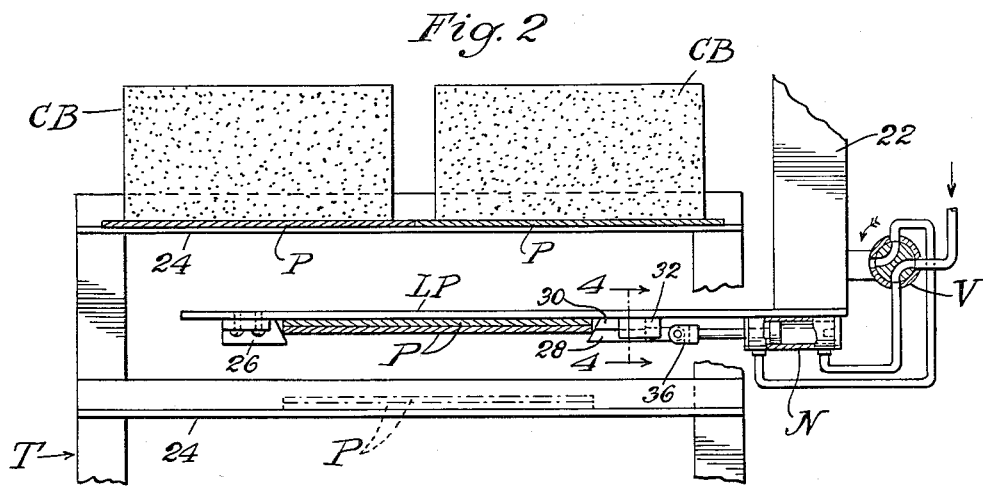
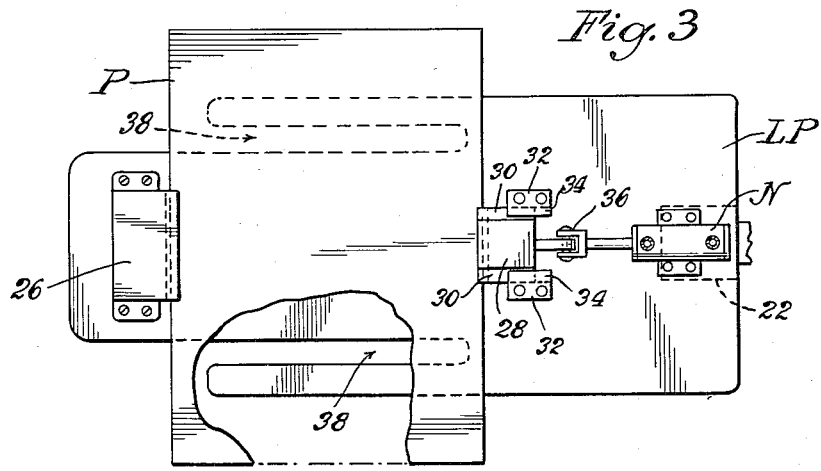
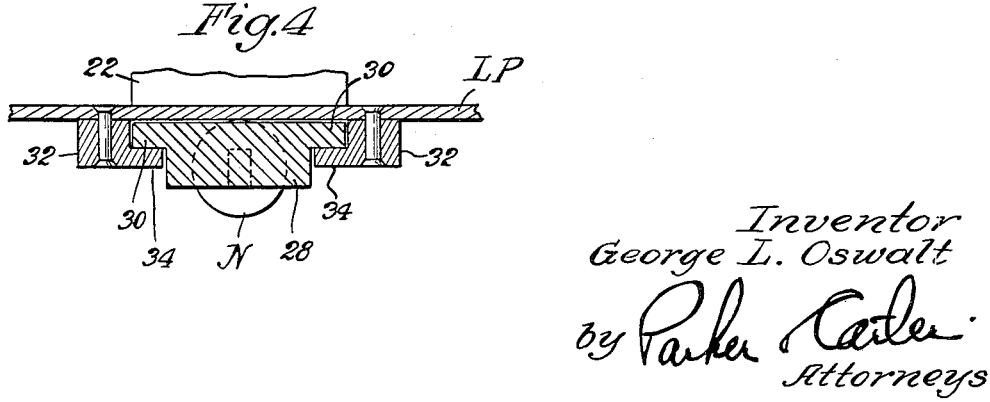
Inventor
George L. Oswalt
by Parker Carter
Attorneys

United States Patent Office 2,741,371
Patented Apr. 10, 1956

2,741,371

PALLET LIFTER

George L. Oswalt, Elmwood Park, Ill.

Application June 24, 1952, Serial No. 295,312

1 Claim. (Cl. 212—35)

My invention resides in the field of molded blocks manufacture and is an improvement on prior devices used in handling molded blocks in and around conventional cinder block making machines.

Heretofore a difficult problem has arisen with regard to the handling of molded blocks after they are formed by a molding machine. The blocks on pallets are brought out of the conventional molding machine on a horizontal track or runway at the end of which it has been the custom for a workman to lift the blocks off and place them in some form of conveying means, such as a truck, a dolly, etc.

My invention employs structure for mechanically lifting one or more molded blocks on pallets from the end of the track or runway and placing them on a truck or dolly. After depositing the green blocks on the truck, the device will pick up two empty pallets from the truck and return them to a stack of pallets beneath the unloading track so that the empty pallets can be fed again into the cinder block molding machine and the cycle resumed.

Therefore, the primary object of this invention is a device for handling molded blocks from the molding machine track and for placing them on the dolly.

Another object is to provide this unloading mechanism with a pallet grasping device so that as the green blocks are placed on the truck, empty pallets can be picked up during the return movement of the lifting mechanism and returned to the pallet feeding mechanism.

Another object is a pair of jaws on the bottom of the lifting or conveying mechanism for the blocks for grasping pallets from the truck.

Another object is a readily accessible automatic means for actuating one or both of the jaws so that the empty pallets can be easily grasped and released.

Other objects will from time to time appear or be obvious in the accompanying specification and drawings that follow, in which:

Figure 2 is a side elevational view of the lifting platform of the handling mechanism inserted into the truck with parts in section, the view showing lifting platform immediately after depositing a set of green blocks on the truck and just after picking up two empty pallets;

Figure 3 is a bottom plane view of the lifting platform showing the details of the fixed and movable jaws; and Figure 4 is a sectional view taken, on an enlarged scale, along line 4—4 of Figure 2.

Figure 1:
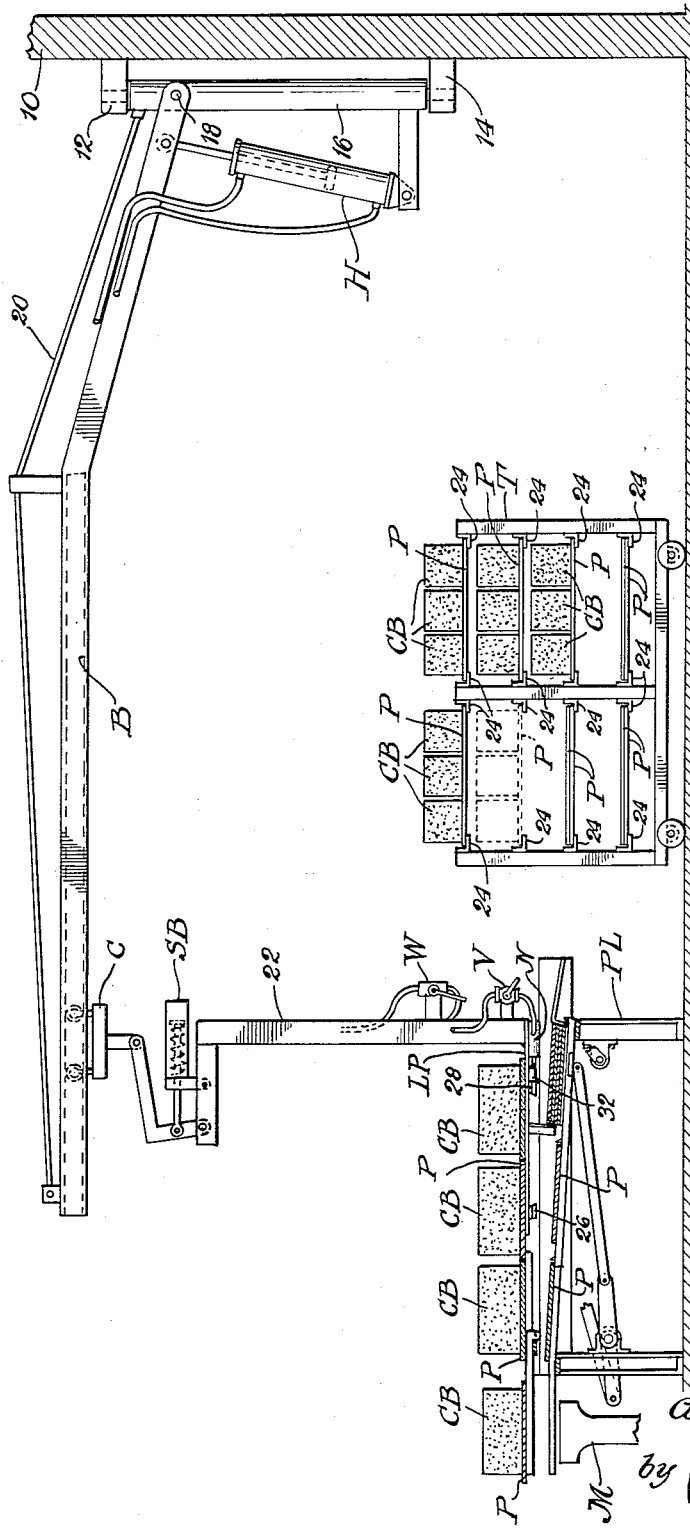
Figure 1 is a side elevational view of a finger lift or lifting platform supported by an overhead boom, operating between the discharge track of a conventional molding machine and a truck for removing the cinder blocks.

In Figure 1, B is a boom extending generally horizontally outward from a wall or post 10, this boom B taking the form of an I-beam. The boom is pivoted to the wall 10 by any suitable means such as bearings 12 and 14 and with an axle 16 interpositioned therebetween so as to form a vertical pivot and allowing the boom a side expanse of movement in a horizontal plane. The boom B is pivoted at 18 to the axle 16 so that movement in a vertical plane is provided. Any suitable supporting structure 20 may be attached to the top in and around the boom B so as to adequately strengthen it and provide for the cantilever forces which will be applied to the boom by the lifting mechanism as described hereinbelow. The boom is actuated to pivot at 18 by any suitable manually controlled mechanism such as the hydraulic piston H. This piston is connected to a controlling switch W positioned on or near the lifting platform so that an operator stationed at the end of the track of the cinder block molding machine can quickly and easily energize or deenergize the piston H to raise and lower the outer end of the boom and, consequently, operate the lifting mechanism.

A lifting platform LP is positioned at the outer end of the boom and is connected to a vertical post 22 that depends from a freely rolling carriage C on the boom B. The surface configuration of the lifting platform LP is irregular, such as shown in Figure 3, the sides having slots 38, so that the platform will fit in and around various guide ways, rails and supporting structure of the pallet feeder track. These slots serve as a positioning and centering means for the lifting platform as it is inserted under the pallet feeder track. As the boom is of I-beam construction, rollers or any suitable means can be interposed on either side so as to travel in the channels and allow the carriage to be moved in either direction along the boom by the operator depending upon the position that he desires for the lifting mechanism. A spring buffer SB is provided intermediate the carriage C and the lifting mechanism so that a resilient connection is afforded when the cinder blocks are picked up from the track by the lifting mechanism.

M indicates generally any conventional molding mechanism for the cinder blocks CB and as the details of this molding machine form no part of the present invention, only its relative position with respect to the overall structure has been shown. A pallet loading an unloading device PL is stationed adjacent the molding machine to feed pallets P to and from the molding mechanism in timed relation to its operation. The pallet feeder is composed of two tracks, a lower track for feeding empty pallets from a stack to the molding machine, and an upper track for feeding the pallets with the green cinder blocks from the machine to an unloading station. At the unloading station the green cinder blocks and pallets are removed as a unit by the lifting mechanism and placed on any form of truck or dolly T. As the details of the pallet loading and unloading device are fully disclosed and claimed in my copending application, Serial No. 295,311, filed June 24, 1952, it forms no part of the present invention and will not be referred to except only generally as is necessary for an adequate explanation of the present invention.

The molded cinder blocks CB on the pallets are moved out or conveyed to the end of the upper track and as explained above, picked up and removed by the lifting platform LP. As best shown in Figure 2, the pallets with the cinder blocks are loaded on the truck T and held in position on shelves formed of angle irons 24, see Figure 1. The lifting platform LP has secured to its underside a set of jaws 26 and 28, jaw 26 being fixed by any suitable means such as rivets, and the jaw 28 being movable so that a grasping action is acquired between the two. The movable jaw is provided with any conventional actuating means, the one shown in Figure 2 including a hydraulic piston N with inlet and outlet lines leading to a piston control valve V. This valve is also placed on the vertical lifting post 22 adjacent the switch W that controls the boom B so as to be in the vicinity of the operator and readily accessible and easily operated by him in the loading operation.

As best shown in Figure 4, the movable jaw 28 has outstanding ears or flanges 30. Attached to the underside of the lifting platform are a pair of brackets 32 that have corresponding flanges 34 inwardly directed so as to form a dove-tailed groove within which the movable jaw is supported and horizontally movable. A flexible coupling 36 is interposed between jaw 28 and piston N so as to compensate for any eccentricity in the mounting of either one or the other. These jaws are undercut or tapered inwardly so as to grasp and hold two pallets residing between them.

The use, operation and function of my device are as follows:

As the cinder blocks CB are ejected from the molding mechanism M they are conveyed along the upper track of the pallet loading and unloading device PL. At the outer-most point of the upper track they are lifted by the operator by insertion of the lifting platform between the upper and lower tracks. The operator then conveys the lifting platform manually to the truck T where the blocks are placed on the shelves 24. In the sequence of operations, as the operator begins to fill an empty truck the highest shelves are used first with each succeeding load being placed in the next highest shelf and so forth until its lower surface between the two jaws contacts and becomes flush with two empty pallets that have been placed on the shelves of the truck. The operator then actuates valve V so as to thrust the movable jaw 28 toward the fixed jaw 26 to grasp the two pallets. The lifting platform is then returned manually to the pallet loading and unloading device carrying the two empty pallets on its underside when it is again inserted under the upper track preparatory to receiving another load of blocks. At this point the valve V is again actuated by the operator so as to fully separate the jaws dropping the empty pallets P on the stack at the lower end of lower track of the pallet feeding device.

The insertion of the lifting platform can be accomplished in one or more stages. Using two stages the platform is inserted sufficiently to place the empty pallets residing on its underside over the stack of empty pallets on the lower track at which point the operator releases the pallets, appropriately depositing them on the stack, then the lifting platform is inserted further to a position appropriate for taking on another load of cinder blocks. If only one stage is used, the lifting platform is fully inserted before the empty pallets are dropped.

It should be obvious that numerous changes can be made in the details and construction of this device without departing from the essence or fundamental theme of the invention. For example, I have shown and described a hydraulic piston N for actuating the movable jaws 28; however, any suitable electric means could be substituted for this without a change in the inventive concept. I also contemplate the use of a simple manual means for sliding the movable jaw with an overcenter spring to hold the jaw 28 in either its clamped or unclamped position. Likewise numerous other changes can be made without departing from the spirit of my invention, and the embodiment shown should only be interpreted as illustrative and in no sense to restrict my invention other than by the appended claim.

I claim:

For use with a concrete block molding machine for handling and transporting both loaded and unloaded pallets of either magnetic or non-magnetic material, a pallet lifter including a generally elongated horizontally disposed platform of substantial width adapted to support loaded pallets on its upper surface and unloaded pallets on its lower surface, manually actuatable power means for imparting movement to the platform, and manually controllable power means on the lower surface of the platform for releasably holding empty pallets without marring the edges of the pallets, including a pair of jaws disposed longitudinally opposite each other and having opposed pallet engaging faces, one of the jaws being fixedly mounted relative to the platform while the other is longitudinally movable, guides attached to and depending from the lower surface of the pallet for directing the longitudinal movement of the movable jaw, the pallet engaging face on each jaw having a plain relatively smooth undercut surface disposed at a substantial angle with respect to the platform, the angles of the faces being disposed to converge downwardly, the undercut surface on each jaw extending a substantial distance down from the lower surface of the platform so that at least two empty pallets can be carried on the lower surface by the jaws at the same time.

References Cited in the file of this patent
UNITED STATES PATENTS

| | | |
|---|---|---|
| 2,535,911 | Frame | Dec. 26, 1950 |
| 2,535,961 | Schutt | Dec. 26, 1950 |
| 2,574,131 | Steinbrecher | Nov. 6, 1951 |
| 2,581,568 | Wooley | Jan. 8, 1952 |
| 2,586,843 | McDonald | Feb. 26, 1952 |